US006990873B2

(12) United States Patent
Rennen et al.

(10) Patent No.: US 6,990,873 B2
(45) Date of Patent: Jan. 31, 2006

(54) ELECTRIC MOTOR DRIVE WITH A WORM

(75) Inventors: Michael Rennen, Bad Soden (DE); Thomas Mann, Nidderau (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/739,048

(22) Filed: Dec. 19, 2003

(65) Prior Publication Data
US 2004/0129102 A1    Jul. 8, 2004

Related U.S. Application Data

(63) Continuation of application No. PCT/DE02/02084, filed on Jun. 7, 2002.

(51) Int. Cl.
*F16H 1/12* (2006.01)
(52) U.S. Cl. .................. 74/421 A; 74/425; 185/11
(58) Field of Classification Search ............... 74/25, 74/425, 421 A; 185/10, 11, 40 A, 40 B; 251/129.01, 129.03, 129.11
See application file for complete search history.

(56) References Cited

U.S. PATENT DOCUMENTS 4,533,114 A     8/1985  Cory et al.
4,573,723 A *   3/1986  Morita et al. ............ 292/336.3
5,722,510 A *   3/1998  Viale ....................... 185/40 R
5,986,369 A *   11/1999 Hanley et al. ................ 310/77

FOREIGN PATENT DOCUMENTS

DE        198 55 613 A1    6/1999
EP        1 101 919 A2     5/2001
RU        2 009 365 C1     3/1994

OTHER PUBLICATIONS

Derwent Abstract—DE 19855613A1; Jun. 17, 1999; Kabushiki Kaisha Topcon, JP-Tokyo.
Derwent Abstract—RU 2 009 365C1; Mar. 15, 1994; Klimov, Russia.

* cited by examiner

*Primary Examiner*—David Fenstermacher
(74) *Attorney, Agent, or Firm*—Siemens AG; Jacob Eisenberg

(57) ABSTRACT

The invention relates to an electromotive drive comprising an electric motor, having a driving pinion which meshes with a toothed wheel to form a first gear speed. A worm is connected to an output shaft of the toothed wheel in a fixed manner, enabling a worm wheel to be driven. The worm and the worm wheel form a second gear speed, and the shaft of the worm wheel forms the output shaft of the electromotive drive. The output shaft of the electromotive drive can be rotatably driven between a starting position and an end position. When the electric motor is not fed by a current, the output shaft of the toothed wheel can be rotatably driven by a pull-back spring in the rotational direction towards the starting position. The second gear speed is a non-self-locking gear speed.

11 Claims, 2 Drawing Sheets

ELECTRIC MOTOR DRIVE WITH A WORM

CROSS REFERENCE TO RELATED APPLICATIONS

The present application is a continuation of international application PCT/DE02/02084, filed Jun. 7, 2002, and which designated the United States, and claims priority to German reference 10133630.6, filed on Jul. 11, 2001, the both of which are herein incorporated by reference.

BACKGROUND OF THE INVENTION

The invention relates to an electric motor drive having an electric motor whose drive pinion engages with a with a gearwheel forming a first transmission stage, having a worm which is firmly connected to the drive shaft of the gearwheel and by means of which a worm gear can be driven, with the worm and the worm gear forming a second transmission stage and the shaft of the worm gear forming the output drive shaft of the drive shaft of the electric motor drive can be driven such that it can rotate between an initial position and a final position.

Electric motor drives such as these are used for widely differing purposes and have the advantage of compact construction with only relatively small required drive forces. For applications in which the initial position must be assumed for the sake of safety in the event of failure of the drive by the electric motor, it is necessary to ensure that the initial position is assumed.

SUMMARY OF THE INVENTION

The object of the invention is thus to provide an electric motor drive of the type mentioned initially which assumes its initial position automatically in the event of failure of the electric motor, but has a small, compact physical size.

According to the invention, this object is achieved in that the output drive shaft of the gearwheel when no current is flowing through the electric motor can be driven such that it can be rotated by a restoring spring in the rotation direction to the initial position, and the second transmission stage is a non self-locking transmission stage which can rotate freely in both rotation directions.

The use of a worm and worm gear as the second transmission stage intrinsically means that only a small physical space is required.

The arrangement of the restoring spring between the two transmission stages also allows the force of the restoring spring to be designed to be very small, and thus allows the size of the restoring spring and the physical space it requires likewise to be minimized. The torque to be applied by the restoring spring is determined by the transmission ratio, the friction torques and the external load.

The friction torques are reduced by the restoring spring having a driving effect on the worm, which means that considerably less resistance needs to be overcome in the second transmission stage by the restoring spring than if the restoring spring had to provide the backward movement via the output drive shaft of the electric motor drive and the worm gear.

Furthermore, any load which is applied to the output drive shaft of the electric motor drive is reduced by the second transmission stage as a function of its transmission ratio, thus likewise reducing the restoring force to be applied by the restoring spring.

The non self-locking design of the second transmission stage allows it to move freely in both rotation directions.

If the first transmission stage is a spur gear transmission, then this results in an advantageous lever ratio between the two gearwheels in the spur gear transmission, which likewise leads to a reduction in the forces to be applied by the restoring spring. Furthermore, a high-speed electric motor can be used for normal operation, owing to the advantageous transmission ratio of the spur gear transmission.

The restoring spring may be a helical spring.

However, if the restoring spring is a spiral spring, then this keeps the required physical space small.

It is particularly advantageous for the spiral spring to be a drive spring which is arranged in a spring housing with an opening stress. In the case of a drive spring such as this, there is only a relatively small increase in the spring force during the stressing movement, thus ensuring that the electric motor drive is reset to the initial position of the electric motor drive when no current is flowing through the electric motor. There is no need for a more powerful electric motor which, during the movement of the electric motor drive to its final position during normal operation, would have to overcome an additional increase in the force of a restoring spring by stressing that restoring spring. The size of the electric motor can thus likewise be kept small.

If the restoring spring surrounds the output drive shaft of the gearwheel, then this means that the restoring spring requires only a small physical space.

The output drive shaft of the gearwheel can preferably be moved back through two or more revolutions by the restoring spring.

If the rotation axes of the drive pinion of the electric motor and of the worm extend axially with respect to one another, in particular if the rotation axes of the drive pinion of the electric motor and of the worm run parallel to one another, this makes it possible to achieve a very compact arrangement for the electric motor drive, and thus a very small physical space requirement.

The electric motor drive can advantageously be used for all types of valves or flaps in the engine bay of a motor vehicle. The shaft of the worm gear is preferably a throttle valve shaft of a throttle valve connecting stub for an internal combustion engine, or may drive such a throttle valve shaft. When used in this way, this ensures that the throttle valve will not remain in an undefined open position when no current is flowing through the electric motor, but is moved back to its idle position.

The electric motor may be a DC motor.

BRIEF DESCRIPTION OF THE SEVERAL VIEWS OF THE DRAWINGS

One exemplary embodiment of the invention will be described in more detail in the following text and is illustrated in the drawing, in which.

DETAILED DESCRIPTION OF THE INVENTION

Figure 1:
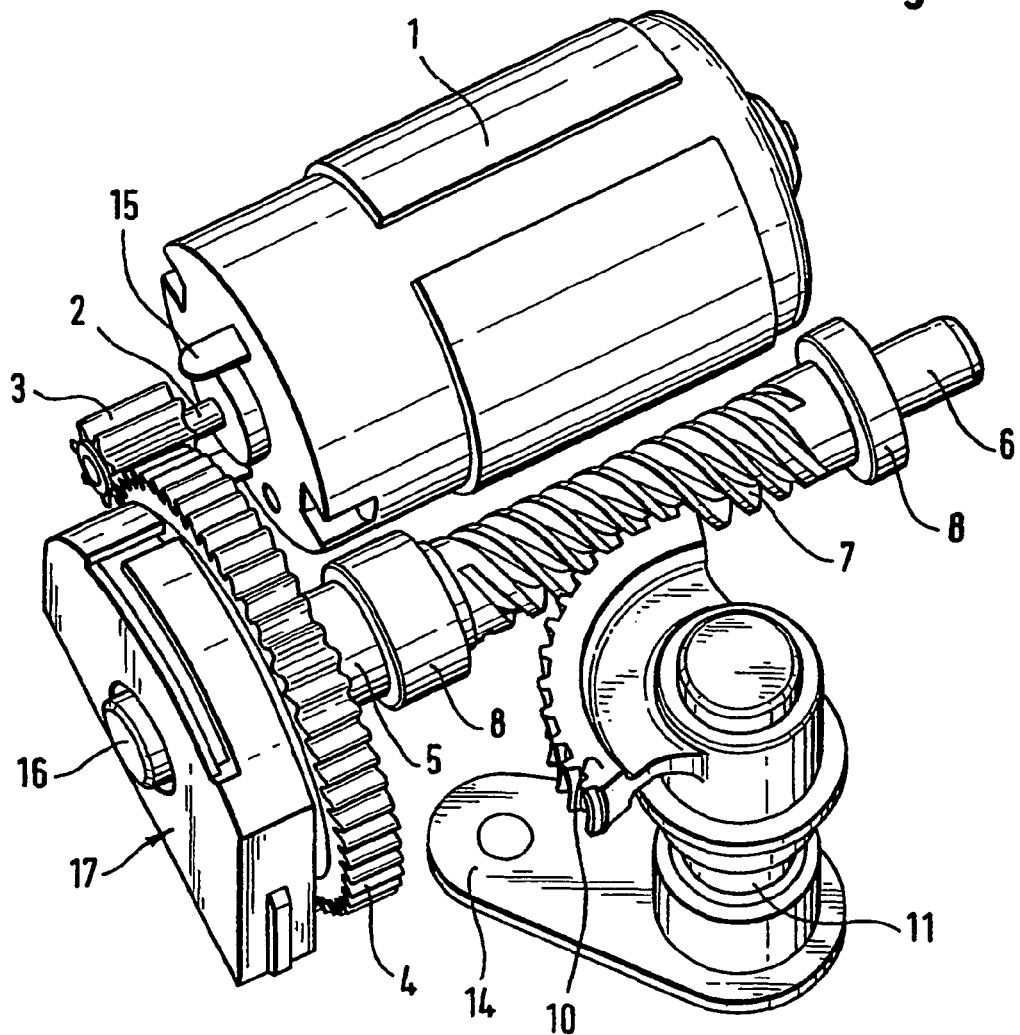
FIG. 1 shows a perspective view of an electric motor drive.
Figure 2:
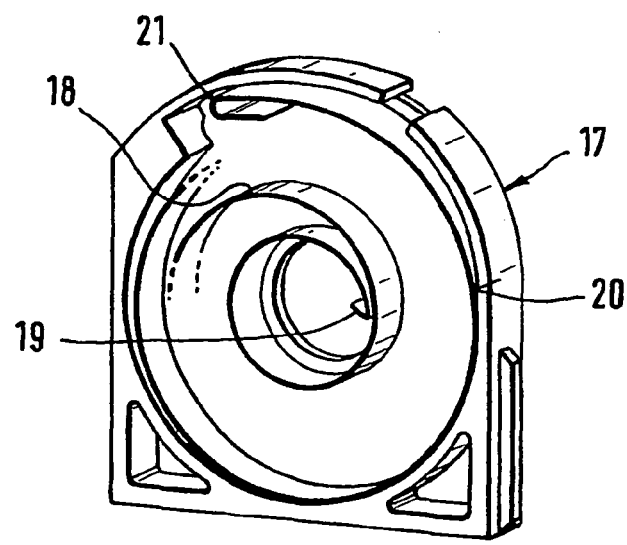
FIG. 2 shows a perspective view of a spring housing with a restoring spring for the electric motor drive as shown in FIG. 1.
Figure 3:
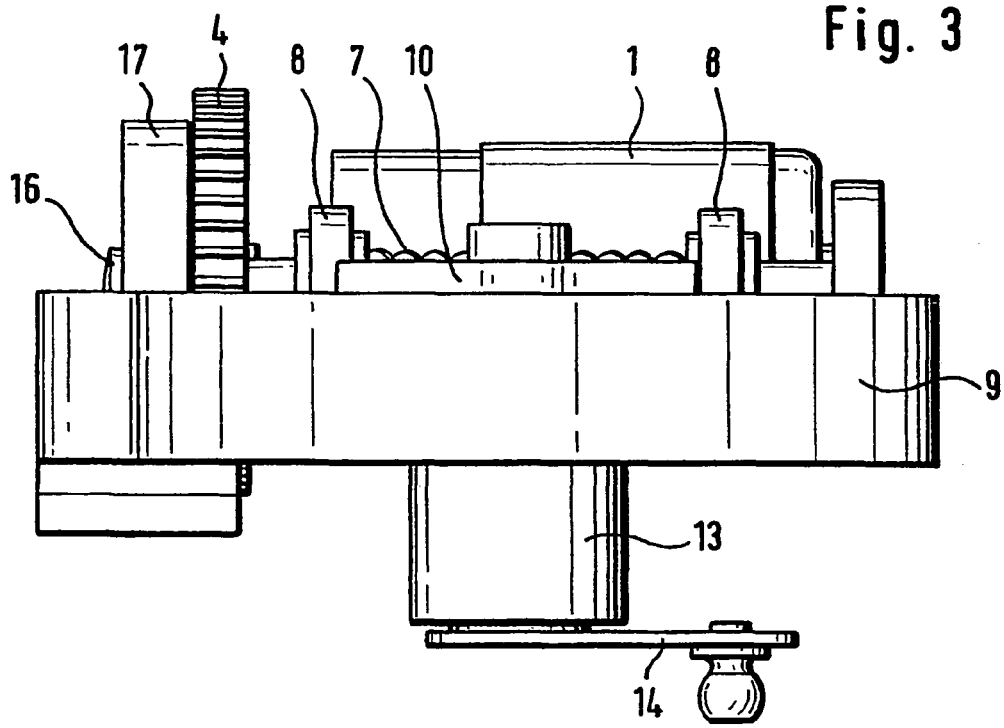
FIG. 3 shows a side view of the electric motor drive as shown in FIG. 1, installed in one housing half.
Figure 4:
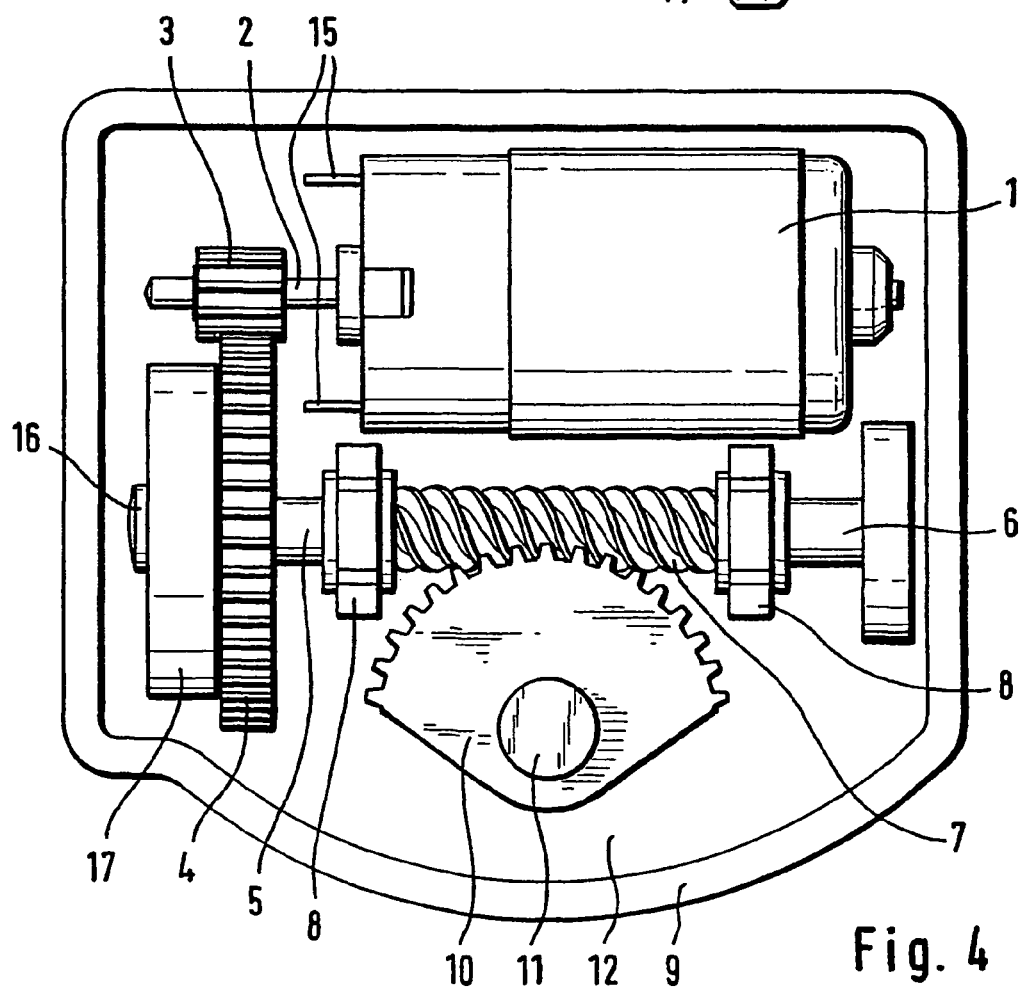
FIG. 4 shows a plan view of the electric motor drive shown in FIG. 3, installed in one housing half.

The electric motor drive which is illustrated in the figures has a DC electric motor 1, which has connecting contacts 15 in the axial direction.

The drive pinion 3 which is arranged on the motor shaft 2 of the DC electric motor 1 and has a small number of teeth engages with a gearwheel 4 having a large number of teeth, forming a spur gear transmission and a first transmission stage for the electric motor drive. The output drive shaft 5 of the gearwheel 4 is coaxially connected firmly to the shaft 6 of a worm 7, with the shaft 6 of the worm 7 and, with it, the output drive shaft 5 being mounted via two bearings 8, which are arranged in a housing shell 9, such that they can rotate.

The worm 7 can drive a worm gear 10, which is in the form of a gearwheel segment, such that it can rotate, with the worm 7 and the worm gear 10 forming a second transmission stage which is a non self-locking transmission stage. The output drive shaft 11, which is mounted in the housing shell 9 such that it can rotate, of the worm gear 10 is passed out of the housing shell 9 to the exterior through an opening in the base 12 of the housing shell 9 and a bearing connecting stub 13 which is mounted on the housing shell 9, and is fitted at its free end with a radially projecting operating lever 14, which can act on a unit which is not illustrated but can be operated by the electric motor drive.

A stepping motor 1 together with a motor shaft 2 and a drive pinion 3 are arranged parallel alongside the worm 7 and the gearwheel 4, so that the electric motor drive is compact without any projecting elements, and the housing shell 9 required for this purpose is likewise small and compact. This housing shell 9 may be supplemented by a second housing shell, which is not illustrated but is approximately the same, to form a housing which completely accommodates the electric drive.

The output drive shaft 5 of the gearwheel 4 has a shaft journal 16, which projects on the side of the gearwheel 4 facing away from the worm 7, and projects approximately centrally into a spring housing 17 which is firmly connected to the housing shell 9. A spiral spring with two or more turns is arranged in the spring housing, surrounding the shaft journal 16, and is in the form of a drive spring 18, with its inner end 19 being firmly connected to the shaft journal 16, and its outer end 21 being firmly connected to the spring housing 17. The drive spring 18, which is in the form of a leaf spring, is arranged with an opening stress in the spring housing 17, which means that, when the electric motor drive is in its initial position, the turns of the drive spring 18 rest in the radially outer direction on the wall 20 of the spring housing 17 surrounding them.

When the electric motor drive is driven from its initial position in the direction of its final position, the drive spring 18 is stressed radially inwards, turn by turn, inwards. In the process, the spring force rises only slightly during the spring movement, so that the additional force to be applied by the stepping motor 1 in addition to the force that is required for the unit to be operated and the force that is required to overcome the resistances of the electric motor drive does not change significantly over the movement distance.

We claim:

1. An electric motor drive comprising:
   a first transmission stage comprising drive pinion engaging a gearwheel, the first transmission stage further comprising a worm firmly connected to an output drive shaft of the gearwheel such that a worm gear can be driven;
   a second transmission stage comprising the worm and the worm gear, wherein the shaft of the worm gear forms an output drive shaft of the electric motor drive such that the output drive shaft of the electric motor drive may he rotatably driven between an initial position and a final position;
   wherein the output drive shaft of the gearwheel can be driven when no current is flowing through the electric motor such that the output drive shaft may be rotated by a restoring spring in the rotation direction to the initial position, and the second transmission stage is a non self-locking transmission stage, and
   wherein the restoring spring is a drive spring arranged in a spring housing with an opening stress.

2. The electric motor drive according to claim 1, wherein the first transmission stage is a spur gear transmission.

3. The electric motor drive according to claim 1, wherein the restoring spring is a helical spring.

4. The electric motor drive according to claim 1, wherein the restoring spring is a spiral spring.

5. The electric motor drive according to claim 1, wherein the restoring spring surrounds the output drive shaft of the gearwheel.

6. The electric motor drive according to claim 1, wherein the output drive shaft of the gearwheel can be moved back through two or more revolutions by the restoring spring.

7. The electric motor drive according to claim 1, wherein a rotation axes of the drive pinion of the electric motor and of the worm extend axially with respect to one another.

8. The electric motor drive according to claim 7, wherein the rotation axes of the drive pinion of the electric motor and of the worm run parallel to one another.

9. The electric motor drive according to claim 1, wherein the shaft of the worm gear is a throttle valve shaft of a throttle valve connecting stub for an internal combustion engine.

10. The electric motor drive according to claim 1, wherein the electric motor is a DC motor.

11. An electric motor drive, comprising:
    a first transmission formed by an electric motor drive pinion engaging a gearwheel, the first transmission further comprising a worm firmly connected to an output drive shaft of the gearwheel whereby the worm gear may be driven;
    a second transmission comprising the worm and worm gear, wherein a shaft of the worm gear forms the output drive shaft of the electric motor drive and the output drive shaft of the electric motor drive may be driven such that it can rotate between an initial position and a final position;
    wherein the output drive shaft of the gearwheel may be driven, when no current is flowing through the electric motor, such that it can be rotated by a restoring spring in a rotation direction to the initial position, and the second transmission stage is a non self-locking transmission stage which can rotate freely in both rotation directions, and
    wherein the restoring spring is a drive spring arranged in a spring housing with an opening stress.

* * * * *